V. I. SIMS.
NURSING BOTTLE.
APPLICATION FILED AUG. 5, 1920.

1,423,038.

Patented July 18, 1922.

INVENTOR
VERA I. SIMS.
BY
*Stilton D. Crandall*
ATTORNEY

UNITED STATES PATENT OFFICE.

VERA I. SIMS, OF SIOUX CITY, IOWA.

NURSING BOTTLE.

1,423,038.    Specification of Letters Patent.    Patented July 18, 1922.

Application filed August 5, 1920. Serial No. 401,335.

*To all whom it may concern:*

Be it known that I, VERA I. SIMS, a citizen of the United States, and a resident of Sioux City, in the county of Woodbury and State of Iowa, have invented certain new and useful Improvements in Nursing Bottles, of which the following is a specification.

My invention contemplates a nursing bottle of the sanitary or cylindrical neckless type, having formed therein a vertical cell for the reception of a thermometer whereby the temperature of the contents of the bottle may be readily determined.

Figure 1:
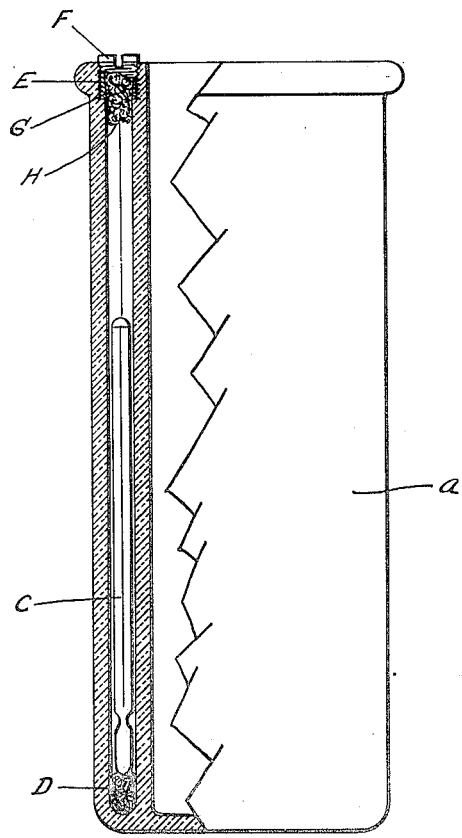
Figure 2:
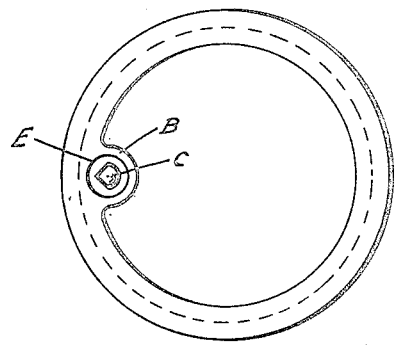

With this and other objects in view, the invention, consisting in the construction, combination, and novel arrangement of parts, will be fully understood from the following description, reference being had to the accompanying drawing, which forms a part of this application and in which like characters of reference indicate corresponding parts in both views, of which:

Fig. 1 is a side elevation of a nursing bottle constructed in accordance with my invention, a part thereof being broken away and shown in section, and Fig. 2 is a plan of the same.

Referring, now, to the illustrations, *a* represents the bottle constructed of glass and cylindrical in shape.

On the interior of the bottle and formed integrally with the wall thereof is a vertical cell, B, the general cross-sectional contour of the interior of which is triangular, to removably receive and conform to the usual medical thermometer, C, to prevent rotation of the thermometer within the cell and hold it therein in such a position that its scale may be read through the adjacent wall of the bottle. In the lower end of the cell is a soft material, as cotton, D, on which the thermometer is normally seated to prevent fracture thereof. The upper end portion of the cell has an enlarged circular opening, E, internally threaded to receive a plug, F, screwed into the opening, E, and preferably provided with a cavity, G, to retain soft material, H, to prevent breaking of the thermometer by contact with the plug. The temperature is conveyed to the thermometer from the contents of the bottle through contact of the thermometer with the wall of the cell or, if desired, the cell may be kept filled with clear liquid, as water. The thermometer is so disposed within the cell that its scale may be read through the adjacent wall of the bottle.

Having thus described my invention, what I claim as new and desire to secure by Letters Patent of the United States, is:

1. A straight sided glass bottle having an interior vertical cell formed integrally with the side of the bottle, open at its upper end and adapted to receive a thermometer, irregular in cross-sectional contour, the interior of the cell being engageable with the thermometer to hold it against rotary movement.

2. A straight sided neckless glass bottle having an interior vertical cell formed integrally with the side of the bottle and adapted to receive a thermometer, irregular in cross-sectional contour, the interior of the cell being engageable with the thermometer to hold it against rotary movement, the upper end portion of the cell opening being enlarged and threaded, and a plug removably screwed into the said opening.

3. A straight sided neckless glass bottle having an interior vertical cell formed integrally with the side of the bottle and having an opening triangular in general cross-sectional contour to receive and hold against rotary movement a thermometer generally triangular in cross-section, and a removable closure for the cell.

In testimony whereof, I have hereunto set my hand this 2nd day of August, 1920.

VERA I. SIMS.